US012269429B2

(12) United States Patent
Logan et al.

(10) Patent No.: US 12,269,429 B2
(45) Date of Patent: Apr. 8, 2025

(54) CARGO COVER ASSEMBLY FOR A VEHICLE

(71) Applicant: Honda Motor Co., Ltd., Tokyo (JP)

(72) Inventors: James J. Logan, Dublin, OH (US); Kyle R. Harp, Cable, OH (US); Edgar Martinez, Marysville, OH (US); Nicholas P. Ziraldo, Powell, OH (US); Edward J. Passarelli, Dublin, OH (US)

(73) Assignee: American Honda Motor Co., Inc., Torrance, CA (US)

( * ) Notice: Subject to any disclaimer, the term of this patent is extended or adjusted under 35 U.S.C. 154(b) by 224 days.

(21) Appl. No.: 18/192,486

(22) Filed: Mar. 29, 2023

(65) Prior Publication Data

US 2024/0326698 A1 Oct. 3, 2024

(51) Int. Cl.
B60R 5/04 (2006.01)

(52) U.S. Cl.
CPC .................... B60R 5/045 (2013.01)

(58) Field of Classification Search
None
See application file for complete search history.

(56) References Cited

U.S. PATENT DOCUMENTS

| 4,363,510 | A |  | 12/1982 | Burst et al. |
| 4,480,675 | A |  | 11/1984 | Berkemeier |
| 5,813,449 | A | * | 9/1998 | Patmore ................. B60R 5/047 |
|  |  |  |  | 296/37.16 |
| 6,105,839 | A | * | 8/2000 | Bell ........................ B60R 7/043 |
|  |  |  |  | 220/9.3 |
| 6,406,083 | B2 | * | 6/2002 | Bharj ..................... B60R 5/044 |
|  |  |  |  | 296/37.16 |
| 6,508,499 | B1 | * | 1/2003 | Guanzon .................. B60R 5/04 |
|  |  |  |  | 296/37.16 |
| 6,702,355 | B1 | * | 3/2004 | Price ....................... B60R 5/045 |
|  |  |  |  | 296/65.09 |
| 6,921,119 | B2 |  | 7/2005 | Haspel et al. |
| 8,096,741 | B2 |  | 1/2012 | Denton et al. |
| 8,162,370 | B2 |  | 4/2012 | Hintennach et al. |
| 8,702,150 | B2 |  | 4/2014 | Saito et al. |
| 9,738,226 | B2 |  | 8/2017 | Kamada et al. |
| 9,987,991 | B2 |  | 5/2018 | Seel |
| 10,160,389 | B2 |  | 12/2018 | Yoon |
| 10,315,582 | B2 |  | 6/2019 | Southey et al. |
| 10,363,847 | B2 | * | 7/2019 | Umlauf ............... B60N 2/6018 |

(Continued)

FOREIGN PATENT DOCUMENTS

| CN | 107021024 A | 8/2017 |
| CN | 212373287 U | 1/2021 |

(Continued)

Primary Examiner — Joseph D. Pape
(74) Attorney, Agent, or Firm — Suzanne Gagnon; American Honda Motor Co., Inc.

(57) ABSTRACT

A cargo cover assembly for covering a cargo space of a vehicle includes a cover having a pair of longitudinal sides adapted to extend along a longitudinal direction of the vehicle and a pair of lateral side adapted to extend in a lateral direction of the vehicle. The cover assembly also includes a pair of rod assemblies coupled to the pair of longitudinal sides of the cover and configured to be removably coupled to a vehicle body. The pair of rod assemblies is configured to extend along the longitudinal direction of the vehicle when engaged with the vehicle body.

20 Claims, 4 Drawing Sheets

(56) References Cited

U.S. PATENT DOCUMENTS 10,974,654 B2     4/2021    Park et al.
2022/0340083 A1   10/2022   Liu et al.

FOREIGN PATENT DOCUMENTS

| | | |
|---|---|---|
| DE | 202004020363 U1 | 4/2005 |
| DE | 102009010967 B4 | 5/2019 |
| EP | 1818217 B1 | 3/2010 |
| EP | 3118062 B1 | 6/2018 |
| FR | 2929898 A3 | 10/2009 |
| WO | 2021208375 A1 | 10/2021 |

\* cited by examiner

CARGO COVER ASSEMBLY FOR A VEHICLE

BACKGROUND

Vehicles, such as, hatchbacks, minivans, sports utility vehicles, etc., typically include, a cargo space arranged behind the rear seats that is generally visible from a rear windscreen of the vehicles. Accordingly, goods stored in the cargo space, such as tools, cameras, and other valuables, are exposed to the eyes of passersby. A suitable cover assembly is generally mounted inside the vehicle to cover the cargo space from above. However, the existing cover assemblies are either fixedly mounted to the vehicle or are difficult to remove, which is undesirable. Moreover, a relatively large space is needed to store the existing cover assemblies when removed from the vehicle.

SUMMARY

In accordance with one embodiment of the present disclosure, a cargo cover assembly for covering a cargo space of a vehicle is disclosed. The cargo cover assembly includes a cover having a pair of longitudinal sides adapted to extend along a longitudinal direction of the vehicle and a pair of lateral side adapted to extend in a lateral direction of the vehicle. The cargo cover assembly further includes a pair of rod assemblies coupled to the pair of longitudinal sides of the cover and configured to be removably coupled to a vehicle body. The pair of rod assemblies is configured to extend along the longitudinal direction of the vehicle when engaged with the vehicle body.

In accordance with another embodiment of the present disclosure, a vehicle is provided. The vehicle includes a vehicle body defining a cargo space for storing one or more cargo and including a pair of longitudinal sidewalls. The vehicle also includes a cover having a pair of longitudinal sides adapted to extend along a longitudinal direction of the vehicle and a pair of lateral side adapted to extend in a lateral direction of the vehicle. The cover is configured to cover the cargo space when engaged with the vehicle body. Moreover, the vehicle includes a pair of rod assemblies coupled to the pair of longitudinal sides of the cover and removably coupled to the pair of longitudinal sidewalls of the vehicle body and extending in the longitudinal direction of the vehicle when engaged with the vehicle body.

In accordance with yet a further embodiment of the present disclosure a cargo cover assembly for covering a cargo space of a vehicle is disclosed. The cargo cover assembly includes a cover having a pair of longitudinal sides adapted to extend along a longitudinal direction of the vehicle and a pair of lateral side adapted to extend in a lateral direction of the vehicle. The cargo cover assembly also includes a pair of rod assemblies coupled to the pair of longitudinal sides of the cover and configured to be removably coupled to a vehicle body. The pair of rod assemblies is configured to extend along the longitudinal direction of the vehicle when engaged with the vehicle body. Moreover, the cargo cover assembly includes at least one engagement structure coupled to a first lateral side of the pair of lateral sides of the cover and configured to couple with a seat of the vehicle.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-6, wherein like numbers indicate the same or corresponding elements throughout the views.

Figure 1:
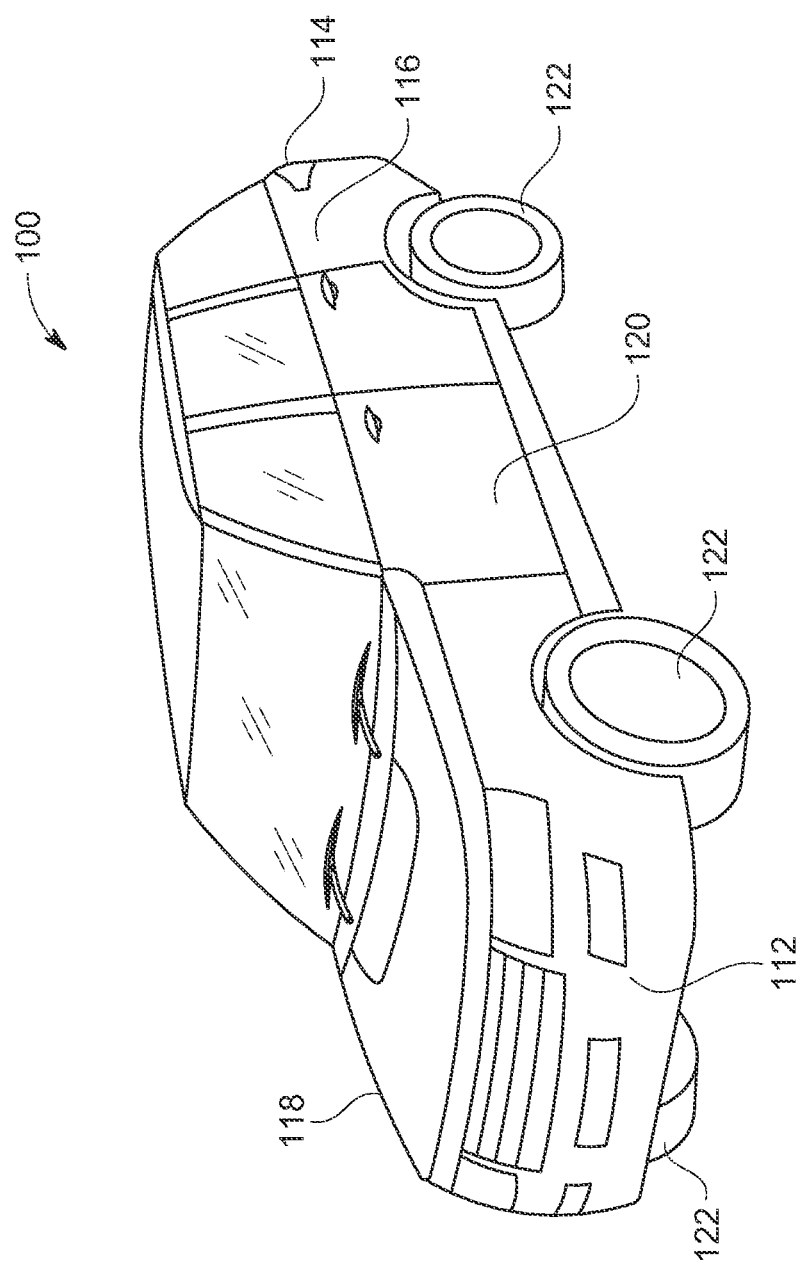
FIG. 1 is a perspective view of a vehicle, in accordance with one embodiment of the present disclosure.

FIG. 1 illustrates a perspective view of a vehicle, indicated generally at 100, in accordance with one embodiment of the present disclosure. The vehicle 100 is shown as a hatchback; however, the vehicle 100 in accordance with alternative embodiments can comprise any variety of vehicles, including multi-utility vehicles, sport utility vehicles, jeeps, trucks, etc., for example. The vehicle 100 includes a front end 112, a rear end 114, a first longitudinal side 116 (e.g., left side), a second longitudinal side 118 (e.g., right side), and a vehicle body 120 extending from the front end 112 to the rear end 114 and supported on a plurality of wheels 122.

Figure 2:
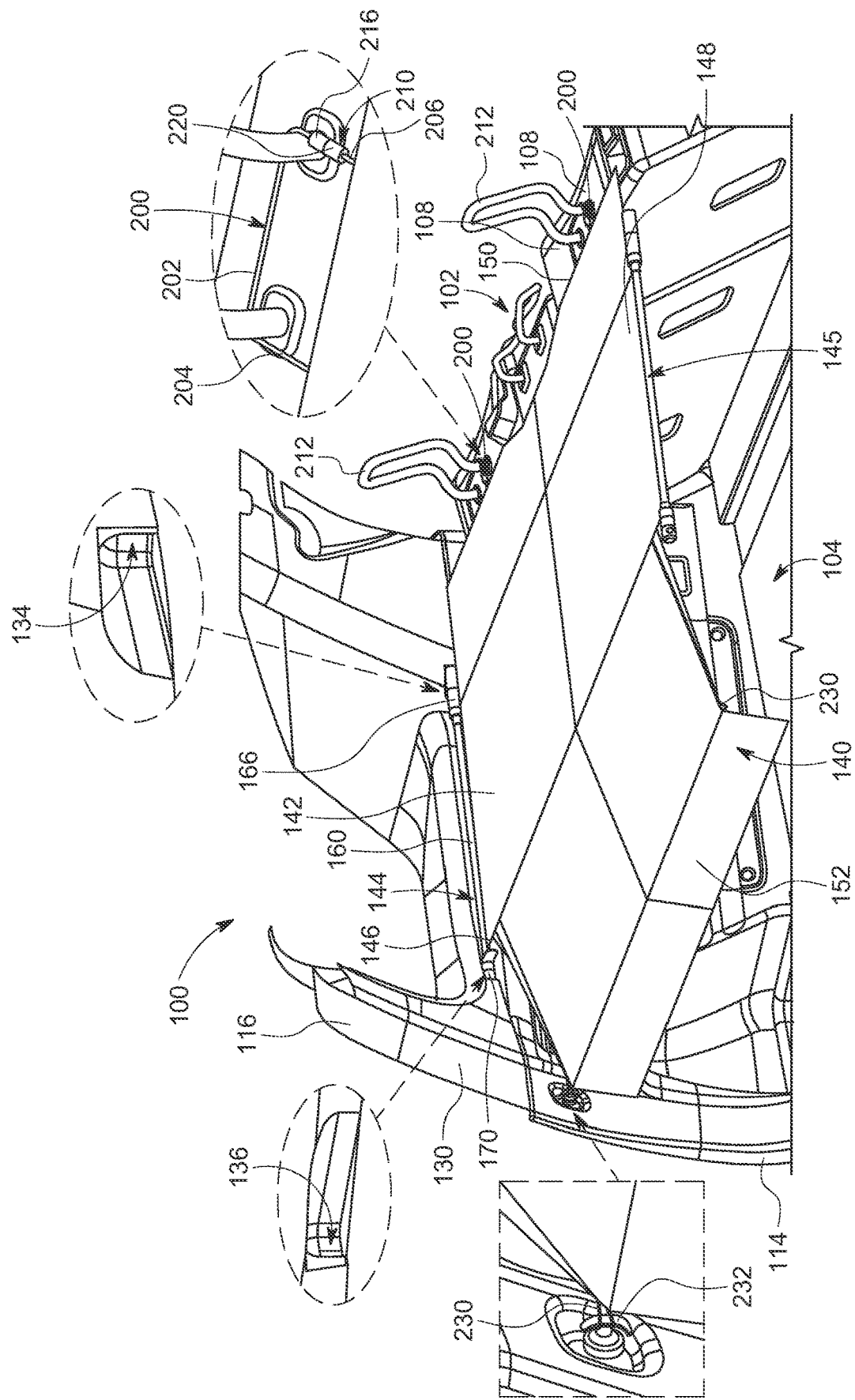
FIG. 2 depicts a rear portion of the vehicle with a cargo cover assembly arranged covering a cargo space of the vehicle with some of the components of the vehicle removed for clarity, in accordance with one embodiment of the present disclosure.

Referring to FIG. 2, the vehicle body 120 defines a passenger compartment 102 and a cargo space 104. The passenger compartment 102 includes a plurality of seats having one or more rear seats 108 to facilitate a seating of a plurality of passengers including a driver inside the vehicle 100. The cargo space 104 is arranged at a rear of the vehicle body 120 to enable a storage of one or more cargo inside the vehicle 100. Moreover, the vehicle body 120 includes a pair of side linings 130 (only one is shown) arranged inside the vehicle body 100 and defining inside longitudinal sidewalls of the vehicle body 120. The side linings 130 extend in the longitudinal direction and are arranged on the opposite longitudinal sides 116, 118 of the vehicle 100. The side linings 130 extend from the rear end 114 of the vehicle body 120 towards the front end 112. As shown, each of the side linings 130 (i.e., each of the longitudinal sidewalls of the vehicle body 120) defines a first slot 134 (i.e., first preset) arranged proximate to the rear seat 108 of the vehicle 100, and a second slot 136 (i.e., second preset) arranged opposite to the first slot 134 and disposed distally from the rear seat 108 and proximate to the rear end 114 of the vehicle 100.

To cover the cargo space 104 from above, the vehicle 100 includes a cargo cover assembly 140 (hereinafter referred to as cover assembly) removably coupled to the longitudinal sidewalls (i.e., side linings 130) of the vehicle body 120. As shown in FIG. 2, the cover assembly 140 has a cover 142 adapted to cover the cargo space 104 from the above, and a pair of rod assemblies 144, 145 to couple the cover 142 with the longitudinal sidewalls (i.e., side linings 130) of the vehicle body 120. The cover 142 includes a pair of longitudinal sides 146, 148 adapted to extend along a longitudinal direction of the vehicle 100 and a pair of lateral sides 150, 152 adapted to extend in a lateral direction of the vehicle 100. In an exemplary assembly of the cover 142 with the vehicle body 120, a first longitudinal side 146 of the cover 142 is arranged proximate to and extend along one of the pair of side linings 130 and a second longitudinal side 148 of the cover 142 is arranged proximate to and extend along other of the pair of side linings 130. Similarly, a first lateral side 150 of the cover 142 is arranged proximate to the rear seat 108, while a second lateral side 152 of the cover is arranged proximate to the rear end 114 of the vehicle 100.

In some embodiments, the cover 142 may define a pair of elongated pockets (not shown) arranged at and extending along the pair of longitudinal sides 146, 148 of the cover 142. The pockets may enable coupling of the rod assemblies 144, 145 with the cover 142. In other embodiments, the cover 142 may be adhesively coupled to the rod assemblies 144, 145. Additionally, or optionally, the cover 142 may also define one or more elongated pockets arranged at and extending along at least one of the lateral sides 150, 152 for one or more edge rods (not shown) configured to provide additional tension or support for the lateral side when the cover assembly 140 is coupled to the vehicle body 120. Alternatively, the cover 142 may be adhesively coupled to the edge rods. In some embodiments, the cover 142 may be a flexible cover made of a flexible plastic, fabric, or other flexible material. Accordingly, the cover assembly 140 may be folded in a folded configuration or arranged in a rolled configuration by folding and/or rolling the cover 142 around one of the rod assemblies 144, 145 for storage.

Figure 3:
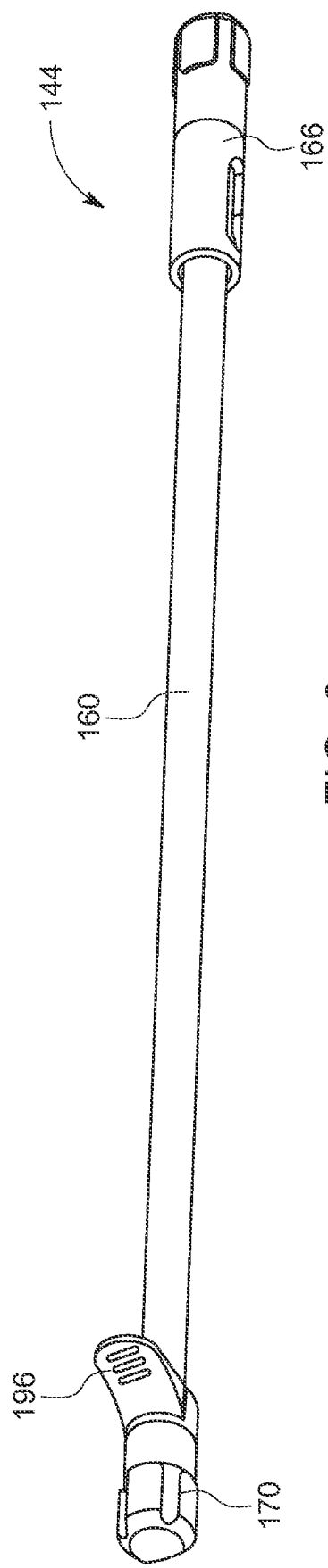
FIG. 3 is a perspective view of a rod assembly of the cargo cover assembly of FIG. 2, in accordance with one embodiment of the present disclosure.
Figure 4:
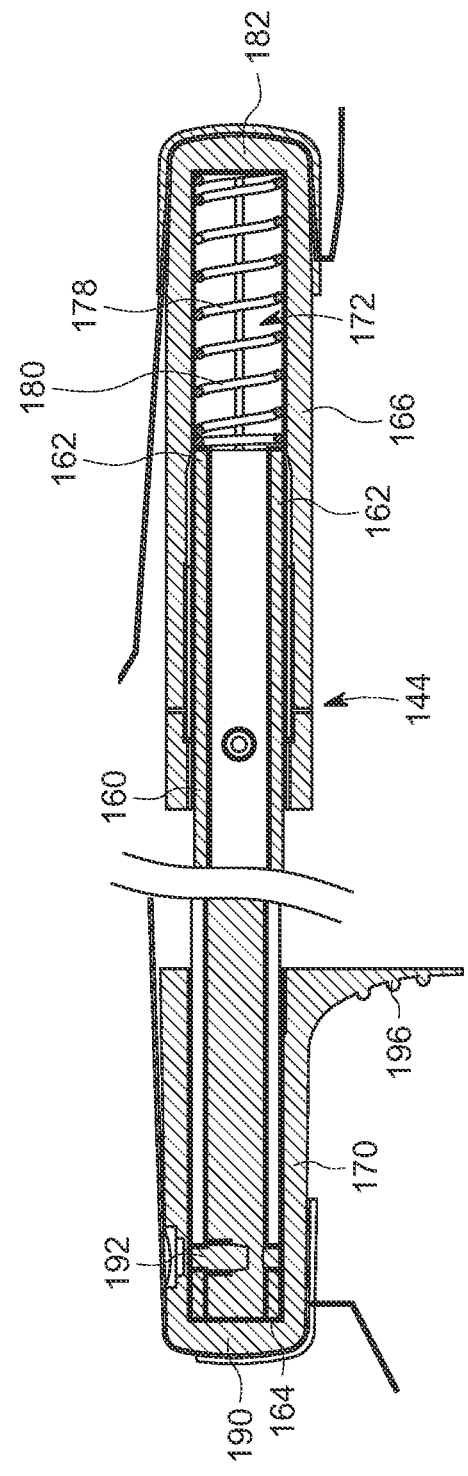
FIG. 4 is a sectional view of the rod assembly of FIG. 3, in accordance with one embodiment of the present disclosure.

Referring to FIGS. 3 and 4, the first rod assembly 144 includes an elongated rod 160 having a first end 162 and a second end 164, a first end cap 166 coupled to the rod 160 and arranged at the first end 162 of the rod 160, and a second end cap 170 coupled to the rod 160 and disposed at the second end 164 of the rod 160. In an embodiment, the rod 160 may be a hollow rod. It may be appreciated that the pair of rod assemblies 144, 145 may be identical in structure, construction, function, and assembly to the cover 142 and the side linings 130, and therefore, for the sake of clarity and brevity, a structure, a construction, a function, and an assembly of only one of the pair of rod assemblies 144, 145, for example, the first rod assembly 144, are described in detail.

Figure 5:
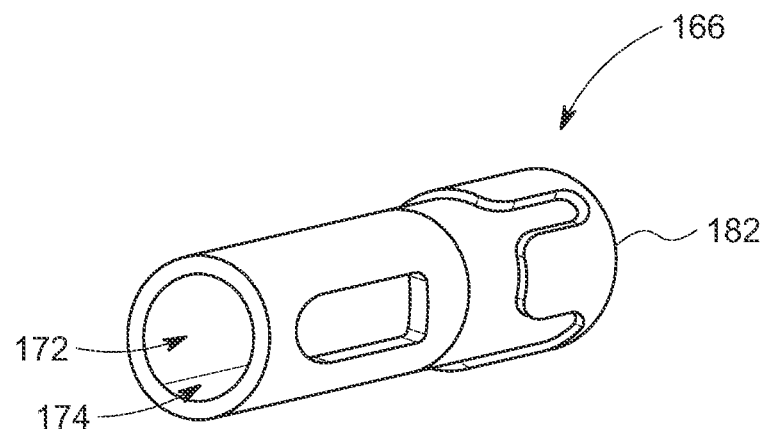
FIG. 5 is a perspective view of a first end cap of the rod assembly of FIG. 3, in accordance with one embodiment of the present disclosure.

As best shown in FIG. 5, the first end cap 166 includes a substantially cylindrical structure and defining an elongated cavity 172 having an access opening 174 at one end of the first end cap 166 and a closed end 182 at other end of the first end cap 166. In one embodiment, the closed end 182 may include a stopper made of rubber or other material. The first end cap 166 may be coupled to the rod 160 by inserting a portion of the rod 160 inside the elongated cavity 172 such that the first end 162 of the rod 160 is arranged inside the elongated cavity 172. As illustrated in FIG. 4, the first rod assembly 144 includes a biasing member 178, for example, a spring 180, disposed inside the cavity 172 and arranged between the closed end 182 of the first end cap 166 and the first end 162 of the rod 160. Accordingly, one end of the biasing member 178 is arranged abutting the closed end 182 of the first end cap 166, while other end of the biasing member 178 is disposed abutting the first end 162 of the rod 160. The biasing member 178 biases the rod 160 in an outward position. Accordingly, to move the rod 160 further inside the cavity 172 towards the closed end 182 of the first end cap 166 from the outward position, the biasing member 178 is compressed.

Figure 6:
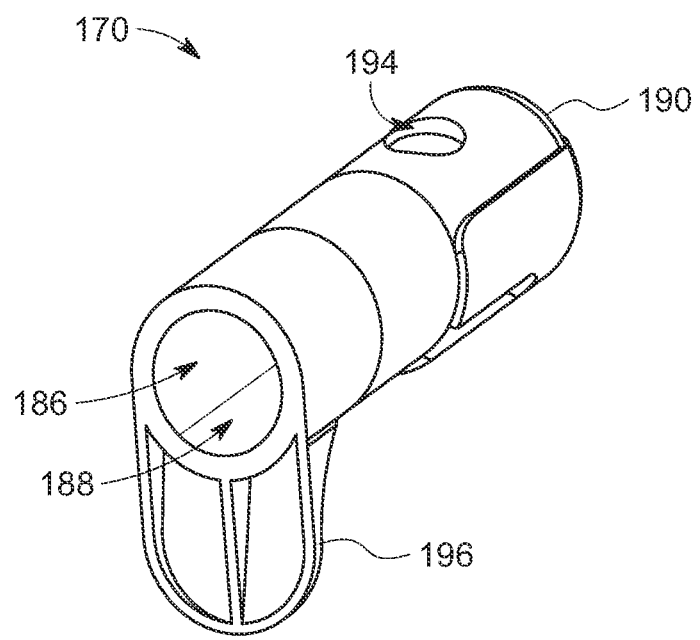
FIG. 6 is a perspective view of a second end cap of the rod assembly of FIG. 3, in accordance with one embodiment of the present disclosure.

Similar to the first end cap 166, as best shown in FIG. 6, the second end cap 170 includes a substantially cylindrical structure defining an elongated cavity 186 having an access opening 188 at one end of the second end cap 170 and a closed end 190 at other end of the second end cap 170. In one embodiment, the closed end 182 may include a stopper made of rubber or other material. Further, the second end cap 170 may include a handle 196 to enable a holding of the second end cap 170 by a user. The second end cap 170 may be coupled to the rod 160 by inserting a portion of the rod 160 inside the elongated cavity 186 such that the second end 164 of the rod 160 is arranged inside the elongated cavity 186, abutting the closed end 190 of the second end cap 170. As illustrated in FIG. 4, the first rod assembly 144 may include a screw 192 that extends through a hole 194 (shown in FIG. 6) of the second end cap 170 and extends inside the rod 160 to secure the second end cap 170 with the rod 160 and to prevent a relative movement between the rod 160 and the second end cap 170 in a longitudinal direction.

Additionally, referring back to FIG. 2, the cover assembly 140 includes at least one engagement structure 200 coupled to the first lateral side 150 of the cover 142 and configured to removably engage or attach to the rear seat 108. In an exemplary embodiment, the engagement structure 200 includes a flexible structure 202 that is removably engaged or attached to a suitable structure of the rear seat 108. As shown in FIG. 2, the flexible structure 202 may include a first portion 204 and a second portion 206. In one embodiment, the flexible structure 202 may be a cable or strap, for example, with the first portion 204 as a first strap portion having one end attached to the cover 142 and the second portion 206 as a second strap portion having one end attached to the cover 142. In an exemplary assembly of the engagement structure 200 with the rear seat 108, the flexible structure 202 is configured to loop around a suitable structure of the rear seat 108, for example, headrest frame 212, of the rear seat 108.

In another embodiment, the engagement structure 200 may also include a coupler 210 removably coupling the first portion 204 to the second portion 206. The coupler 210 includes a plug 216 coupled to one of the first portion 204 and the second portion 206, for example, the first portion 204, and a socket 220 configured to removably receive the plug 216 and coupled to other of the first portion 204 and the second portion 206, for example, the second portion 206. In the illustrated embodiment, the plug 216 is attached to free end of the first portion 204, while the socket 220 is attached to a free end of the second portion 206. To engage the engagement structure 200 with the rear seat 108, and hence to couple the first lateral side 150 of the cover 142 with the rear seat 108, the flexible structure 202 is looped around the headrest frame 212, and then the plug 216 is inserted inside the socket 220. In other embodiments, the flexible structure 202 may include one or more connecting elements with the first portion 204 as a strap portion with at least one strap element having one end attached to the cover 142 and the second portion 206 as a clamp portion (not shown) with at least one clamping element having one end attached to the first portion 204. In an exemplary assembly of the engagement structure 200 with the rear seat 108, the at least one clamping element of the second portion 206 of the flexible structure 202 is configured to clamp onto, for example, a pillar of the headrest frame 212 of the rear seat 108.

Additionally, or optionally, referring again to FIG. 2, the cover assembly 140 may include a pair of flexible ring structures 230 coupled to the second lateral side 152 of the cover 142 and adapted to be removably engaged with suitable structures of the vehicle 100. As shown in FIG. 2, the vehicle 100 may include a pair of hooks 232 coupled to the side linings 130 of the vehicle 100, and arranged proximate to the rear end 114 of the vehicle 100. The ring structures 230 are configured to engage with the hooks 232 to support the cover 142, and restrict a sagging of a rear portion of the cover 142. In other embodiments, the edge rods (not shown) may be arranged at and extend along at least one of the pair of lateral sides 150, 152 of the cover 142 to help support the cover 142.

A method of engaging and coupling the cover assembly 140 to the vehicle body 120 is now described. To engage the cover assembly 140 with the vehicle body 120, the rod assemblies 144, 145 are coupled to the longitudinal sidewalls (i.e., side linings 130) of the vehicle body 120. For so doing, an end portion of the first end cap 166 of the first rod assembly 144 is inserted inside the first slot 134 (i.e., first preset) of the longitudinal sidewall (i.e., associated side lining 130). Thereafter, the rod 160 is moved toward the closed end 182 of the first end cap 166 to the inward position, thereby compressing the biasing member 178. In some embodiments, the handle 196 of the second end cap 170 may be pushed by the user in a direction toward the first end cap 166 to move the rod 160 and compress the biasing member 178. Upon moving the rod 160 towards the closed end 182 of the first end cap 166, the second end cap 170 is aligned with the second slot 136 (i.e., second preset 136) of the longitudinal sidewall (i.e., associated side lining 130). Upon aligning the second end cap 170 with the second slot 136, the compressive force holding the rod 160 at the inward position is removed, causing the biasing member 178 to return to its original position, which moves the rod 160 to the outward position, and resulting in the insertion of the second end cap 170 inside the second slot 136. In this manner, the first rod assembly 144 is secured with the longitudinal sidewall of the vehicle body 120. Similarly, the second rod assembly 145 is engaged and secured to the longitudinal sidewall of the vehicle body 120. In this manner, the cover assembly 140 is engaged to the pair of sidewalls of the vehicle body 120, covering the cargo space 104 from above.

Additionally, the first lateral side 150 of the cover 142 is engaged and coupled to the rear seat 108. In one embodiment, when the flexible structure 202 includes the coupler 210, the plug 216 is removed from the socket 220, and the flexible structure 202 is looped around the headrest frame 212 of the rear seat 108, and then the plug 216 is inserted inside the socket 220 to couple the engagement structure 200 to the rear seat 108. In another embodiment, when the flexible structure 202 includes at least one clamping element, the flexible structure 202 is pushed onto the pillar of the headrest frame 212, so that the second portion 206 engages and clamps onto the headrest frame 212. In this manner, all the engagement structures 200 are arranged with the rear seats 108 to support the first lateral side 150 of the cover 142 on the rear seats 108. Further, in some embodiments, the flexible ring structures 230 of the cover 142 are coupled to the hooks 232. In this manner, the second lateral side 152 of the cover 142 is also supported on the vehicle body 120. Accordingly, the cover assembly 140 can be easily engaged with the vehicle 100 (i.e., vehicle body 120) without requiring any specialized tools or skill.

For disengaging the cover assembly 140 from the longitudinal sidewalls of the vehicle body 120, the flexible ring structures 230 are disengaged from the hooks 232. Subsequently, the rod assemblies 144, 145 are disengaged from sidewalls (i.e., side linings 130) of the vehicle body 120. For so doing, the rod 160 of the first rod assembly is pushed and moved towards the front of the vehicle 100, compressing the biasing member 178, thereby causing the removal of the second end cap 170 from the second slot 136. In some embodiments, the handle 196 of the second end cap 170 may be pushed by the user in a direction toward the first end cap 166 to move the rod 160 and compress the biasing member 178. Thereafter, the second end cap 170 is pulled inwardly of the cargo space 104 in the lateral direction, causing the second end cap 170 to move out of alignment from the second slot 136. As the push force is removed from the rod 160, the biasing member 178 pushes the rod 160 in the outwards position. Subsequently, the first rod assembly 144 is disengaged from the longitudinal sidewall by removing the first end cap 166 from the first slot 134. Similarly, the second rod assembly 145 is disengaged from the longitudinal sidewall of the vehicle body 120.

Furthermore, the engagement structures 200 are disengaged from the headrest frames 212 of the rear seat 108 by disengaging the flexible structures 202 from the headrest frames 212. In one embodiment, when the flexible structures 202 include the couplers 210, the cover 142 may be pulled towards the rear end 114 of the vehicle 100, causing the plugs 216 to come out of the sockets 220. In another embodiment, when the flexible structures 202 include the clamping elements, the cover 142 may be pulled toward the rear end 114 of the vehicle 100, causing the second portions 206 (i.e., the clamping elements) to be released from the pillars of the headrest frames 212. Accordingly, the cover assembly 140 is easy to disengage and remove from the vehicle body 120 without the assistance of special tools or skill. Further, upon disengaging and removing the cover assembly 140 from the vehicle body 120, the cover 142 may be folded and/or rolled and wrapped around one of the rod assemblies 144, 145 into a roller or cylindrical configuration, and may be stored inside a small storage space of the vehicle 100.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A cargo cover assembly for covering a cargo space of a vehicle, the cargo cover assembly comprising:
   a cover having a pair of longitudinal sides adapted to extend along a longitudinal direction of the vehicle and a pair of lateral sides adapted to extend in a lateral direction of the vehicle; and a pair of rod assemblies coupled to the pair of longitudinal sides of the cover and configured to be removably coupled to a vehicle body, wherein the pair of rod assemblies is configured to extend along the longitudinal direction of the vehicle when engaged with the vehicle body, wherein each of the pair of rod assemblies comprises:
- a rod having a first end and a second end,
- a first end cap arranged at the first end of the rod and defining an elongated cavity, wherein a portion of the rod is arranged inside the cavity, and
- a biasing member arranged inside the cavity and arranged between the first end of the rod and an end of the first end cap, wherein the biasing member biases the first end cap to an outward position.

2. The cargo cover assembly of claim 1, further comprising at least one engagement structure coupled to a first lateral side of the pair of lateral sides of the cover and configured to couple with a seat of the vehicle.

3. The cargo cover assembly of claim 2, wherein the at least one engagement structure comprises:
- a first portion and a second portion, and
- a coupler configured to removably couple the first portion to the second portion to removably engage the at least one engagement structure with the seat of the vehicle.

4. The cargo cover assembly of claim 2, wherein the at least one engagement structure comprises: a first portion and a second portion, wherein the first portion includes at least one strap element and the second portion includes at least one clamping element.

5. The cargo cover assembly of claim 1, wherein each of the pair of rod assemblies further comprises a second end cap arranged at the second end of the rod.

6. The cargo cover assembly of claim 1, wherein the biasing member is compressed to facilitate the coupling of a rod assembly with the vehicle body.

7. The cargo cover assembly of claim 1, wherein the cover is configured to be arranged in a folded configuration or a rolled configuration when disengaged from the vehicle body to facilitate a storage of the cargo cover assembly.

8. A vehicle, comprising:
- a vehicle body defining a cargo space for storing one or more cargo and including a pair of longitudinal sidewalls;
- a cover having a pair of longitudinal sides adapted to extend along a longitudinal direction of the vehicle and a pair of lateral sides adapted to extend in a lateral direction of the vehicle, wherein the cover is configured to cover the cargo space when engaged with the vehicle body; and
- a pair of rod assemblies coupled to the pair of longitudinal sides of the cover and removably coupled to the pair of longitudinal sidewalls of the vehicle body and extending in the longitudinal direction of the vehicle when engaged with the vehicle body, wherein each of the pair of rod assemblies comprises:
  - a rod having a first end and a second end,
  - a first end cap arranged at the first end of the rod, wherein the first end cap includes an elongated cavity and a portion of the rod is arranged inside the cavity, and
  - a biasing member arranged inside the cavity and arranged between the first end of the rod and an end of the first end cap, wherein the biasing member of a rod assembly is compressed to facilitate the coupling of the rod assembly with the vehicle body.

9. The vehicle of claim 8, further comprising at least one engagement structure coupled to a first lateral side of the pair of lateral sides of the cover and removably coupled to a seat of the vehicle.

10. The vehicle of claim 9, wherein the at least one engagement structure comprises: a flexible structure with a first portion and a second portion, wherein the first portion includes at least one strap element and the second portion includes at least one clamping element.

11. The vehicle of claim 9, wherein the at least one engagement structure comprises: a first portion, a second portion, and a coupler configured to removably couple the first portion to the second portion.

12. The vehicle of claim 8, wherein each of the pair of longitudinal sidewalls includes a first preset in a longitudinal sidewall, wherein the first end cap is inserted into the first preset when the biasing member of the rod assembly is compressed to facilitate coupling the rod assembly with the longitudinal sidewall.

13. The vehicle of claim 12, wherein each of the pair of rod assemblies further includes a second end cap arranged at the second end of the rod, and each of the pair of longitudinal sidewalls further includes a second preset in the longitudinal sidewall, wherein the second end cap is inserted in the second preset.

14. The vehicle of claim 8, wherein the cover is configured to be arranged in a folded configuration or a rolled configuration to facilitate a storage of the cover when disengaged from the vehicle body.

15. A cargo cover assembly for covering a cargo space of a vehicle, the cargo cover assembly comprising:
- a cover having a pair of longitudinal sides adapted to extend along a longitudinal direction of the vehicle and a pair of lateral sides adapted to extend in a lateral direction of the vehicle;
- a pair of rod assemblies coupled to the pair of longitudinal sides of the cover and configured to be removably coupled to a vehicle body, wherein the pair of rod assemblies is configured to extend along the longitudinal direction of the vehicle when engaged with the vehicle body; and
- at least one engagement structure coupled to a first lateral side of the pair of lateral sides of the cover and configured to couple with a seat of the vehicle, wherein each of the pair of rod assemblies comprises:
  - a rod having a first end and a second end,
  - a first end cap arranged at the first end of the rod, wherein the first end cap includes an elongated cavity and a portion of the rod is arranged inside the cavity,
  - a biasing member arranged inside the cavity and arranged between the first end of the road and an end of the first end cap, and
  - a second end cap arranged at the second end of the rod.

16. The cargo cover assembly of claim 15, wherein the at least one engagement structure comprises:
- a flexible structure having a first portion and a second portion, and
- a coupler configured to removably couple the first portion to the second portion to removably engage the at least one engagement structure with the seat of the vehicle.

17. The cargo cover assembly of claim 15, wherein the at least one engagement structure comprises: a flexible structure with a first portion and a second portion, wherein the first portion includes at least one strap element and the second portion includes at least one clamping element.

18. The cargo cover assembly of claim 15, wherein the second end cap is fixedly engaged to the second end of the rod, and wherein the biasing member biases the first end cap to an outward position.

19. The cargo cover assembly of claim 15, wherein the biasing members of the rod assemblies are compressed to facilitate the coupling of the rod assemblies with the vehicle body.

20. The cargo cover assembly of claim 15, wherein the cover is made of a flexible material and is configured to be arranged in a folded and rolled configuration to facilitate a storage of the cargo cover assembly.

* * * * *